US008708553B2

(12) United States Patent
Colburn et al.

(10) Patent No.: US 8,708,553 B2
(45) Date of Patent: Apr. 29, 2014

(54) SYSTEM FOR VERIFYING TEMPERATURE MEASUREMENT

(75) Inventors: Michael G. Colburn, Burlington, VT (US); Stephen J. Bogner, Colchester, VT (US); David R. McCloskey, Burlington, VT (US); Gavin McCormick, Burlington, VT (US)

(73) Assignee: Cooper-Atkins Corporation, Middlefield, CT (US)

( * ) Notice: Subject to any disclaimer, the term of this patent is extended or adjusted under 35 U.S.C. 154(b) by 81 days.

(21) Appl. No.: 13/373,859

(22) Filed: Dec. 2, 2011

(65) Prior Publication Data

US 2012/0140789 A1 Jun. 7, 2012

Related U.S. Application Data

(60) Provisional application No. 61/420,177, filed on Dec. 6, 2010.

(51) Int. Cl.
 G01K 15/00 (2006.01)
(52) U.S. Cl.
 USPC .......... 374/1; 374/45; 374/183; 374/208; 702/99
(58) Field of Classification Search
 USPC ............ 374/1, 45, 183–185, 208; 702/99
 See application file for complete search history.

(56) References Cited

U.S. PATENT DOCUMENTS

| 2,162,614 | A | | 6/1939 | Fry et al. |
| 3,348,408 | A | | 10/1967 | Engborg |
| 4,051,454 | A | | 9/1977 | Leiser et al. |
| 4,075,882 | A | * | 2/1978 | Waldron ............................ 374/1 |
| 4,734,872 | A | | 3/1988 | Eager et al. |
| 5,586,061 | A | | 12/1996 | Williams et al. |
| 5,636,317 | A | * | 6/1997 | Reznik ........................... 392/312 |
| 5,678,923 | A | | 10/1997 | Germanow et al. |
| 6,007,239 | A | * | 12/1999 | Nickol ............................ 374/1 |
| 6,709,152 | B1 | * | 3/2004 | Bronlund ......................... 374/3 |
| 2003/0101006 | A1 | * | 5/2003 | Mansky et al. ................. 702/30 |
| 2006/0247679 | A1 | * | 11/2006 | Peterman ..................... 606/207 |
| 2008/0043435 | A1 | | 2/2008 | Yip et al. |
| 2008/0251510 | A1 | * | 10/2008 | Park ............................. 219/528 |

OTHER PUBLICATIONS

Harvey, M. E., "Precision Temperature-Controlled Water Bath," Review of Scientific Instruments, vol. 39, No. 1, pp. 13,18, Jan. 1968.*

* cited by examiner

*Primary Examiner* — Lisa Caputo
*Assistant Examiner* — Janice M Soto
(74) *Attorney, Agent, or Firm* — Thomas G. Ference (57) ABSTRACT

The present application is directed to a system for verifying calibration of a temperature sensor comprising an above-ambient temperature verifier and a below-ambient temperature verifier. The above-ambient temperature verifier includes a first housing containing an ohmic material. At least one pair of electrodes is provided to direct an applied current through the ohmic material to heat the material. A well is provided within the ohmic material for accepting a temperature sensor. A compression assembly cooperates with the ohmic material to create intimate contact with the temperature sensor. An above-ambient reference temperature monitor maintains a calibrated temperature within the ohmic material. The below-ambient temperature verifier includes a second housing and a below-ambient reference temperature monitor to maintain a calibrated temperature of a below-ambient temperature medium. The system further includes the ability to log all temperature test measurements from an RFID tag located on each temperature sensor to be verified.

23 Claims, 6 Drawing Sheets

SYSTEM FOR VERIFYING TEMPERATURE MEASUREMENT

RELATED APPLICATIONS

This application claims the benefit of priority of U.S. Provisional Patent Application No. 61/420,177, filed Dec. 6, 2010 entitled "Device for Verifying Temperature Measurement", which is incorporated herein by reference. This patent application is related to U.S. patent application Ser. No. 13/373,858, filed on Dec. 2, 2011, entitled "Mixture of Graphite and Dielectric Particles for Heat Generation and Exchange Devices", which is incorporated herein by reference.

FIELD

This patent application generally relates to a temperature verifier. More specifically it relates to a temperature verifying system that includes an above-ambient temperature verifier and a below-ambient temperature verifier. Still more specifically the above-ambient verifier uses an ohmic material heated by an applied current to set a reference temperature for verifying a temperature sensor under test.

BACKGROUND

Accurately tracking the temperature that certain products are exposed to over time is important in several industries. In the medical and drug industries accurately tracking the temperature of certain drugs with temperature sensors is important because the effectiveness of some drugs decreases over time with exposure to cold and heat. The continued use of these drugs beyond a suggested lifetime may lead to detrimental effects contraindicated to their intended use. In the food services industry accurately tracking the temperature of prepared food is critical for food safety. Monitoring whether food has been cooked properly is commonly tracked with stem-type thermometers that have a long probe with a dial or digital read out on top. Although all thermometers and temperature sensors are calibrated at the factory, they can degrade over time. It is therefore necessary to regularly calibrate these thermometers and temperature sensors to ensure they are accurate. Furthermore, recording and trending calibration data over time can better determine when a particular thermometer or sensor is degrading over time and should be taken out of service. A variety of temperature calibrators exist on the market, but most are not designed for ease of use.

Industries with temperature sensitive products would therefore benefit from a simple, portable temperature verifier that can accurately monitor a variety of temperature sensors over time and at multiple calibration temperatures. The current patent application provides for such a new temperature verifier, the principles of which can be used across a wide variety of temperature monitoring industries.

SUMMARY

One aspect of the present patent application is directed to a system for verifying calibration of a temperature sensor comprising a first housing and an ohmic material contained within the first housing. At least one pair of electrodes is provided to direct an applied current through the ohmic material to heat the material. A well is provided within the ohmic material for accepting a temperature sensor. The well has an inner surface with access to this surface provided through an opening in the first housing. A compression assembly cooperates with the ohmic material to create intimate contact between the inner surface and the temperature sensor when the temperature sensor is placed within the well. An above-ambient reference temperature monitor is also provided to maintain a calibrated temperature within the ohmic material.

BRIEF DESCRIPTION OF DRAWINGS

The foregoing and other aspects and advantages presented in this patent application will be apparent from the following detailed description, as illustrated in the accompanying drawings, in which:

FIG. 3a is a side sectional view of the above-ambient temperature verifier of FIG. 1 in a non-activated state;

FIG. 3b is a side sectional view of the compression assembly used in the above-ambient temperature verifier as shown FIG. 3a;

DETAILED DESCRIPTION

FIGS. 1 through 6 illustrate a system 20 for verifying temperature calibration of a temperature sensor 22. Temperature sensors 22 may be liquid based thermometers, stem-type thermometers that have a long probe with a dial or digital read, or any other type of temperature sensor capable of placement within system 20. System 20 includes an above-ambient temperature verifier 24 and a below-ambient temperature verifier 26. Above-ambient temperature verifier 24 includes a first housing 28 having a hollow chamber 30. An ohmic-material 32 is completely contained within, chamber 30 of first housing 28 as part of thermal unit 31. At least one pair of electrodes 34 is positioned to contact ohmic material 32. Electrodes 34 direct an applied current through ohmic material 32 to resistively heat the ohmic material. Current is supplied to electrodes 34 by a power supply 36. The current flowing through the ohmic material 32 generates an evenly distributed heat within the ohmic material. A well 38 is provided within ohmic material 32 for accepting temperature sensors 22 to be tested. Well 38 has an inner surface 40. Access to inner surface 40 is provided through an opening 42 in first housing 28. Well 38 is conformable and can accept various diameter temperature sensors 22. A compression assembly 44 is provided within first housing 28 to cooperate with ohmic material 32 to reversibly compress the ohmic material around well 38 and create intimate contact between inner surface 40 and temperature sensor 22 when the temperature sensor is placed in the well for testing. Intimate contact with the temperature sensor being tested allows for quick and accurate temperature measurements to be made. An above-ambient reference temperature monitor 46 is positioned within ohmic material 32 for maintaining a calibrated temperature within the ohmic material.

First housing 28 generally comprises a hand-held structure as illustrated in FIGS. 1 through 4. The hand-held structure provides for ease of use; however first housing 28 could take the form of other wall-mount or table-mount structures. First housing 28 may be comprised of various materials, all which preferably do not conduct electricity and do not substantially conduct heat, so as to be safely held by the operator during testing. First housing 28 may be an integrally molded plastic structure formed wholly or from two halves. First housing 28 generally includes a handle 48.

Figure 1:
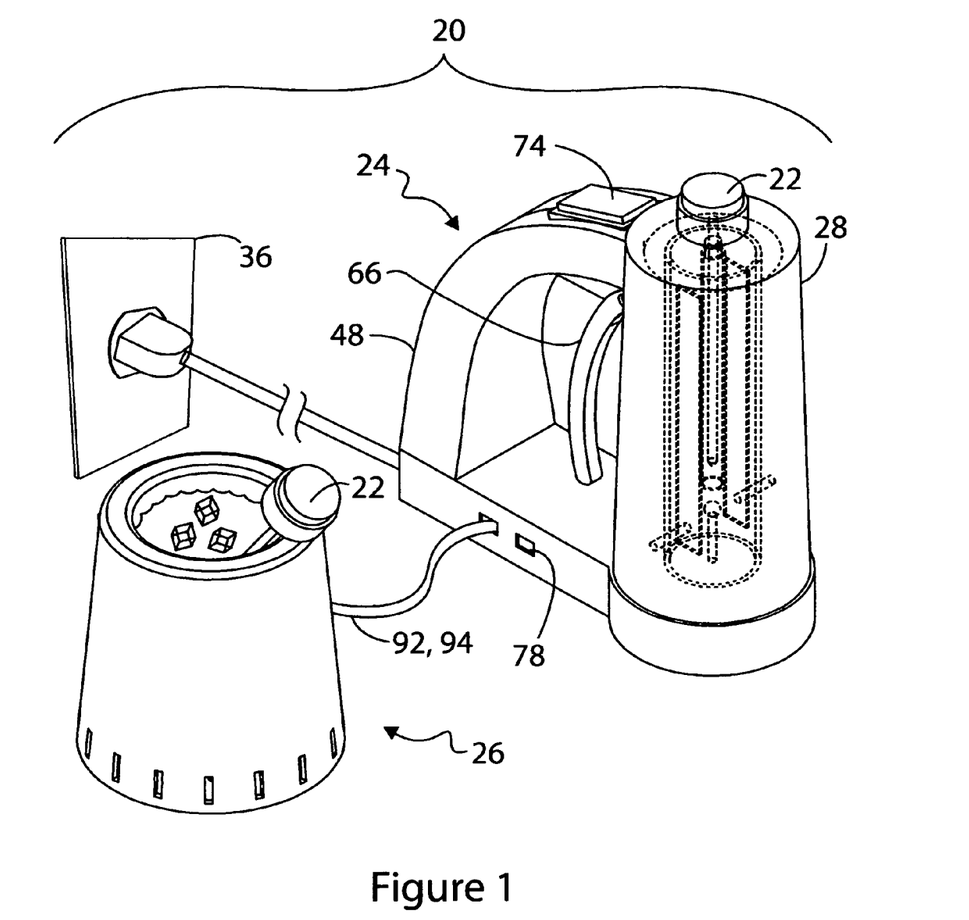
FIG. 1 is an upper perspective view of the system for verifying temperature calibration of temperature sensors according to the present patent application.
Figure 2:
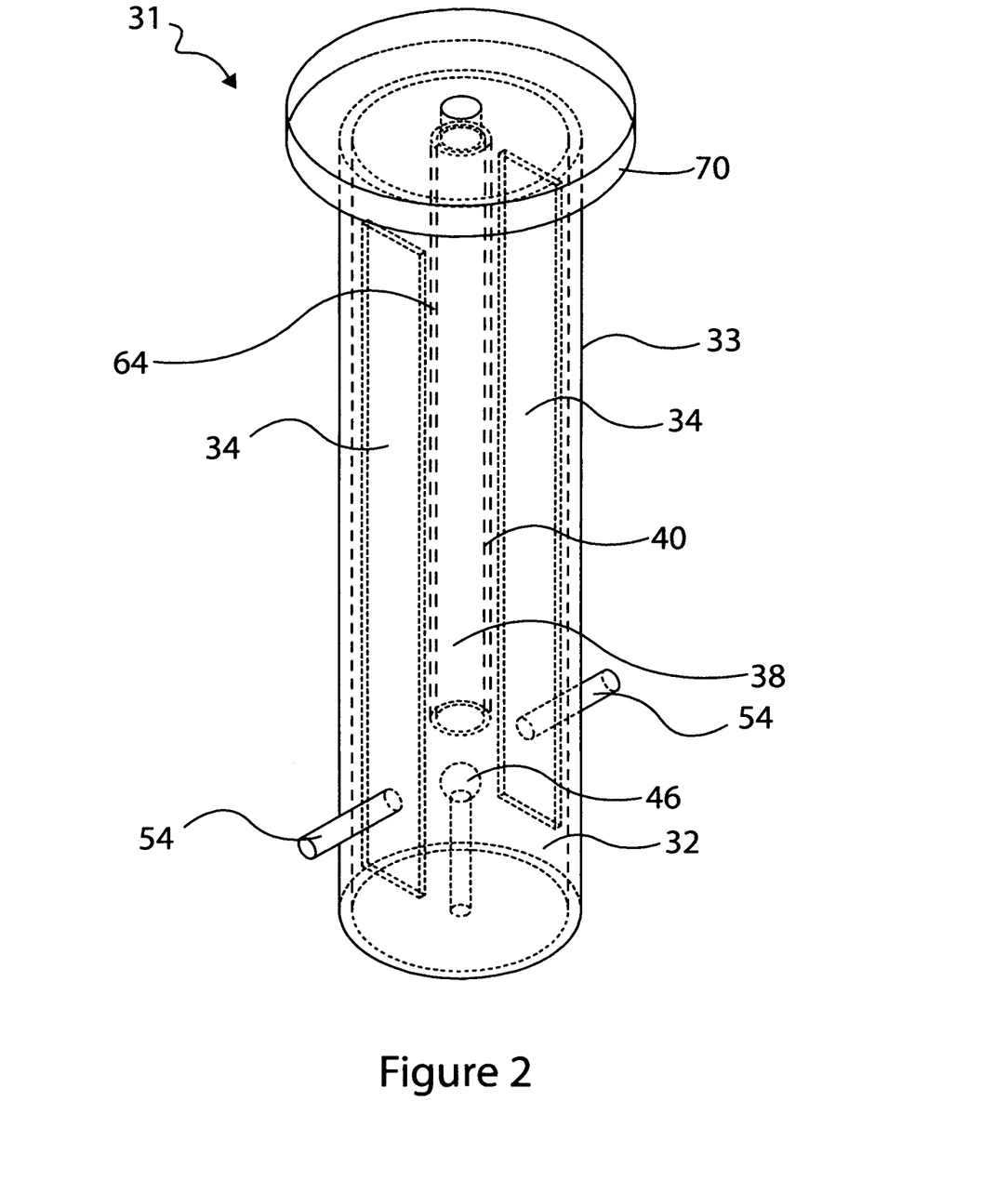
FIG. 2 is an upper perspective view of the ohmically-heated thermal unit for the above-ambient temperature verifier of FIG. 1.
Figures 3A, 3B:
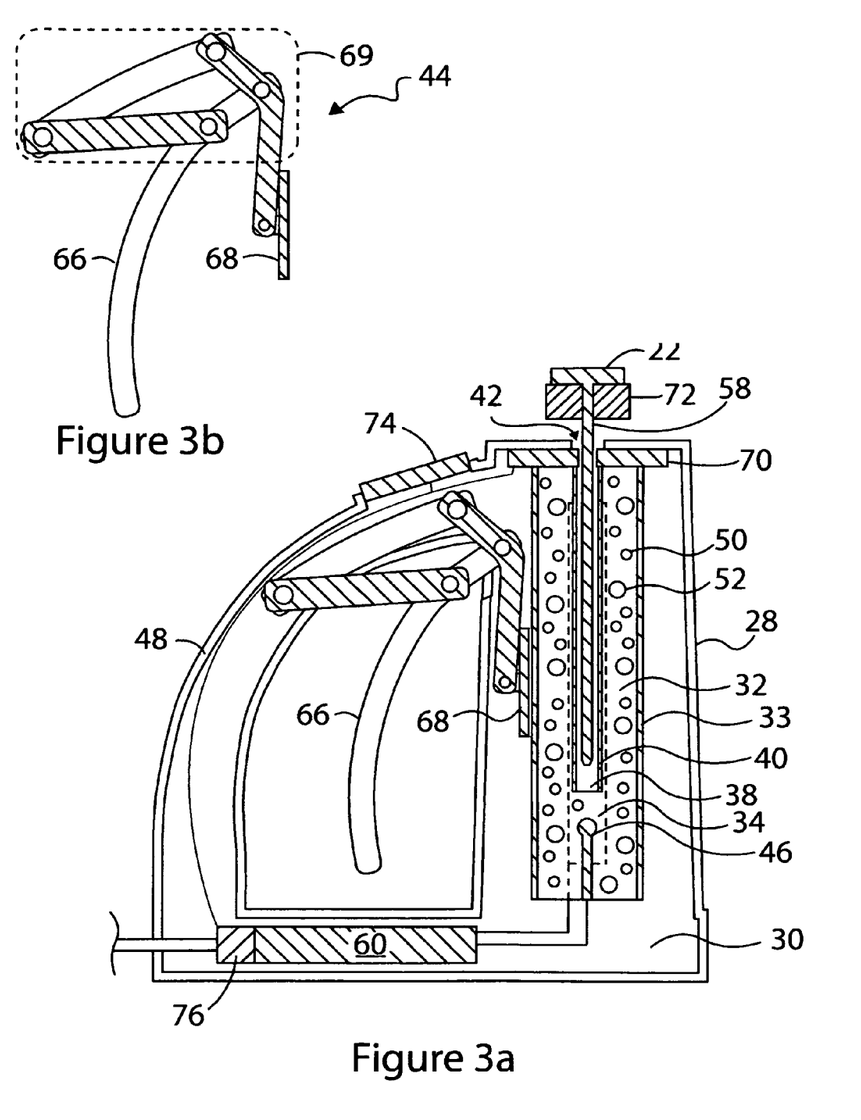
Figure 4:
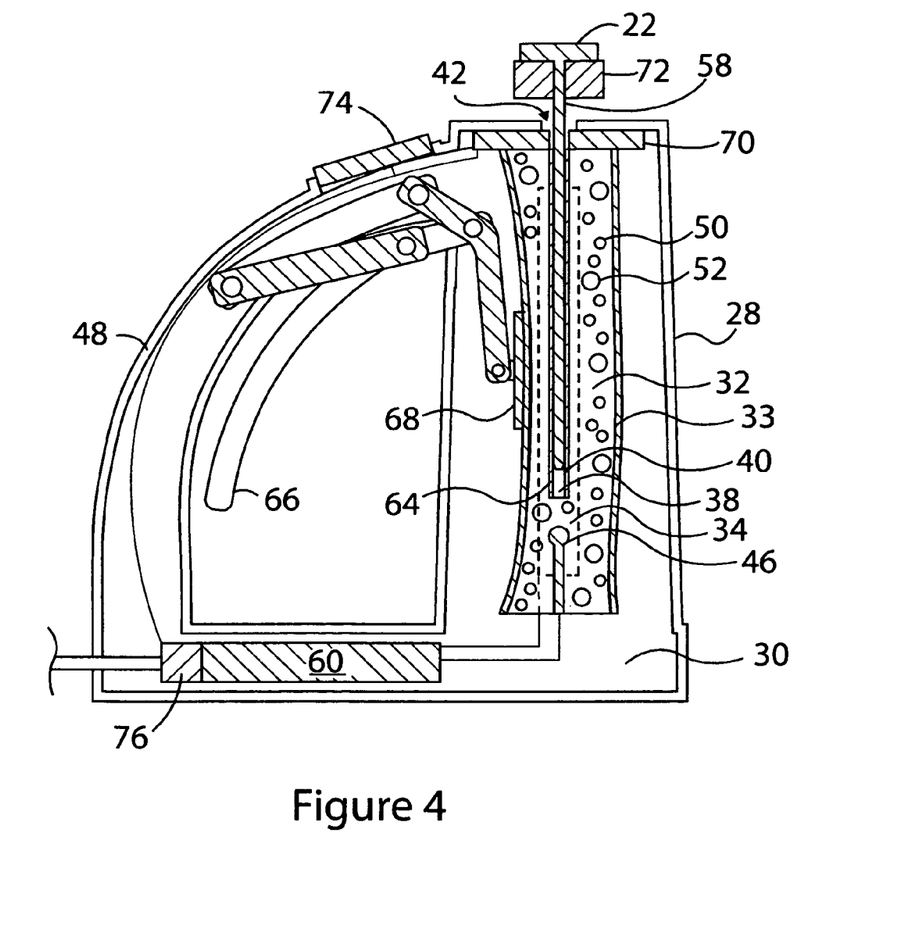
FIG. 4 is a side sectional view of the above-ambient temperature verifier of FIG. 1 in an activated state.

Ohmic material 32 is contained within hollow chamber 30 of first housing 28 as illustrated in FIGS. 3 and 4. The ohmic material 32 is generally comprised of a conformable material that is both electrically conductive and thermally conductive. Ohmic material 32 has a composition that distributes heat substantially evenly throughout, thus allowing for accurate and consistent heat transfer to temperature sensors 22 to be tested. One example of an ohmic material 32 is a mixture of conductive particle 50 and dielectric particles 52. Conductive particles 50 may be graphite and dielectric particles 52 may be glass, thereby being a mixture of solid conductive particles and solid dielectric particles. The formation and use of such mixtures is described in U.S. patent application Ser. No. 13/373,858. Some ohmic materials may further include at least one from the group including a liquid and a gel. The liquid and gel fill the space between conductive particles 50 and dielectric particles 52. Still other ohmic materials 32 that offer uniform heat generation and are reversibly conformable can be used. For example an elastomeric ohmic material comprising a resilient polymer embedded with graphite could be used. The ohmic material 32 is preferably encased in an impervious high temperature cloth or other flexible casing 33 so as to contain the ohmic material and stop the ohmic material from escaping to elsewhere in hollow chamber 30. Some examples of materials for creating a flexible casing 33 are silicone, fiber glass and PTFE (polytetrafluoroethylene).

Electrodes 34 are embedded within ohmic material 32 or disposed in such a manner as to make uniform electrical contact with the ohmic material. Multiple pairs of electrodes 34 may be used to provide more current or more uniform current within ohmic material 32. Electrodes 34 are generally comprised of graphite, titanium, stainless steel, molybdenum, silver, copper, gold, platinum, metal film, or other electrically conductive material. Electrodes 34 may be rigid or flexible. Electrical leads 54 connect electrodes 34 to power supply 36 and control unit 60. Electrical energy is supplied to electrodes 34 when above-ambient reference temperature monitor 46 is below a temperature set point. Applied current from the power supply 36 uniformly heats the mixture. Power supply 36 may be an AC or DC power source. In one embodiment, power supply 36 is comprised of an external power source such as 115 V or 220V power from a standard wall outlet. A transformer may be required to adjust the power to control unit 60. In another embodiment, the power supply 36 is comprised of batteries or a battery pack positioned within handle 48 or other location within hollow chamber 30 of the housing 28.

Above-ambient temperature reference monitor 46 is provided within ohmic material 32 generally adjacent to well 38 where the temperature reading component of shaft 58 of temperature sensor 22 to be tested is to be located. Above-ambient reference temperature monitor 46 accurately sets the temperature of ohmic material 32 to a desired temperature set point. The above-ambient temperature reference monitor 46 is preferably comprised of a resistive thermal device (RTD) made of platinum, copper, nickel, or other RTD metal. The platinum RTD offers the most precision and longevity. Platinum RTDs are available in different nominal resistances, typically specified at 0° C. For higher temperatures, a thermocouple can be used as the above-ambient reference temperature monitor 46. In this case, the measurement will be less precise and the sensor conditioning circuit must be altered. Temperature controller 62 of control unit 60 is integrated with the above-ambient reference temperature monitor 46 to provide electrical energy to electrodes 34 when the temperature of ohmic material 32 is below a temperature set point.

Ohmic material 32 is shaped to have well 38 generally at the longitudinal center for receiving various shaped and sized shafts 58 of temperature sensors 22. Well 38 generally extends from a first longitudinal end to a second longitudinal end of ohmic material 32 so as to receive shaft 58. Well 38 has an inner surface 40. Well 38 may further incorporate a sleeve 64 for separating ohmic material 32 from the inside cavity of the well. Sleeve 64 can define the inner surface 40 of well 38. Sleeve 64 may furthermore be an elastic sleeve. Access to inner surface 40 is provided through an opening 42 in first housing 28. Well 38 is conformable via ohmic material 32 being conformable and thus can accept various diameter temperature sensors 22. The conformability of ohmic material 32 enables direct contact to be made with the surface of shaft 58 of various diameter temperature sensors 22 and therefore allows for a universal temperature sensing system 20. It is appreciated that multiple wells 38 may be utilized in an alternative embodiment.

The compression assembly 44 is used to compress the ohmic material 32. Compression assembly 44 is partially contained within first housing 28. Compression assembly 44 applies an external force to flexible casing 33 to reversibly compress ohmic material 32 around well 38 to create intimate contact between inner surface 40 and the temperature sensor 22 when the temperature sensor is placed within the well. Compression assembly 44 is generally able to be activated by an operator's hand while holding the handle 48. Compression assembly 44 generally includes an activation element 66 connected to a compression element 68. Compression element 68 may be a plate, bladder or band. Compression element 68 move inwardly towards well 38 to squeeze the ohmic material 32 when the activation element 66 is depressed as illustrated in FIG. 4. In one embodiment, FIG. 3b, a four bar linkage 69 is used to generate connection between activation element 66 and compression element 68. Compression element 68 has the ability to be locked in the compressed or inward position so that ohmic material 32 remains in the compressed state until the operator wishes to allow release of temperature sensor 22 being tested. It is appreciated that various mechanical and electrical assemblies may be utilized to provide operable connection between activation element 66 and the compression element 68.

In one embodiment an RFID reader 70 is located near the top of first housing 28, proximate opening 42. Each temperature sensor 22 is provided with an RFID tag 72 mounted to the shaft 58. RFID tag 72 defines each temperature sensor 22 with a unique identity. As temperature sensor 22 is inserted into opening 42 of housing 28, RFID reader 70 reads RFID tag 72, records the temperature sensor's identity, and then logs all data measured for the temperature sensor with that identity so that a temperature measured by the temperature sensor is associated with the unique identity of that temperature sensor and stored in data storage unit 76.

System 20 may further comprise a user interface 74. User interface 74 may be located upon above-ambient temperature verifier 24. User interface 74 may have a direct wired connection or a wireless connection to control unit 60. User interface 74 allows the user to set calibration temperature set points, read temperature measurements, read the identity of each temperature sensors 22 under test, etc. User interface 74 may be comprised of various types, such as but not limited to an LCD structure.

System 20 may further comprise a data storage unit 76. Data storage unit 76 receives information from RFID reader 70, user interface 74 and control unit 60. The data received may be any from the group including the identity of temperature sensor 22, time and date of test, pass or fail criteria of temperature verification and verification temperatures used to perform tests. Data storage unit 76 may include a data output port 78 for extracting any stored data.

Figure 5:
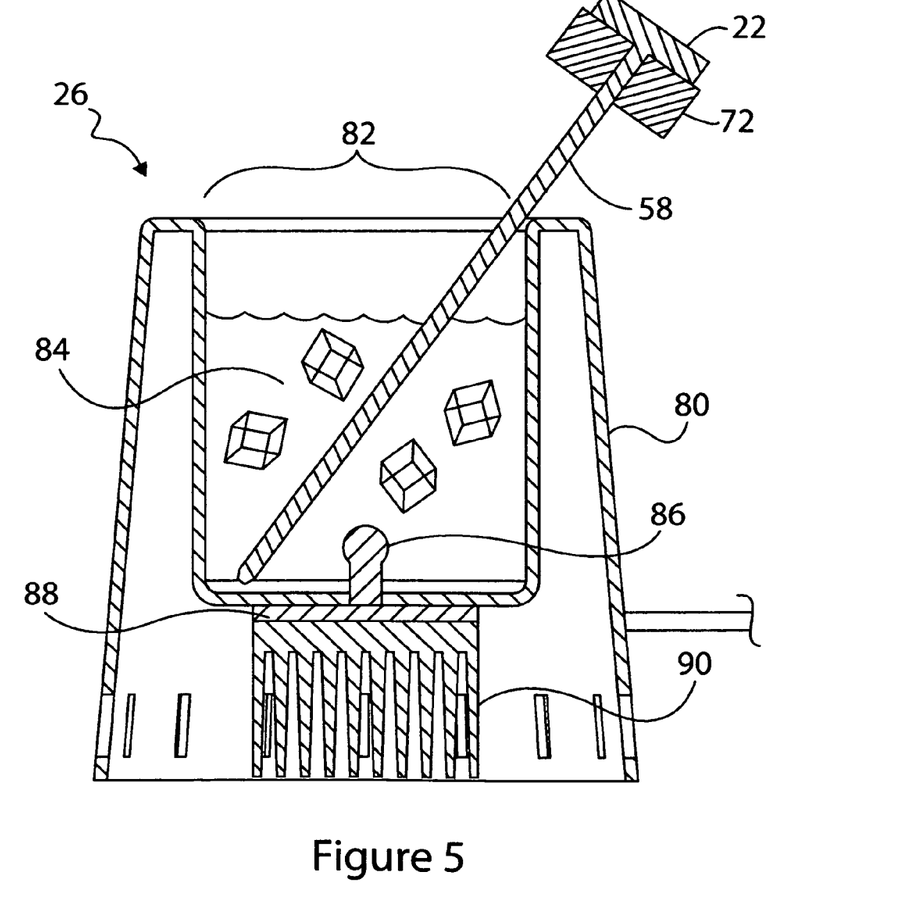
FIG. 5 is a side sectional view of the below-ambient temperature verifier of FIG. 1.

System 20 may further comprise a below-ambient temperature verifier 26 as illustrated in FIG. 5. Below ambient temperature verifier 26 includes a second housing 80 having a reservoir 82. Reservoir 82 includes a below-ambient temperature medium 84 that provides a calibrated, below ambient-temperature environment for placing temperature sensor 22 into to verify the temperature sensor's temperature. A below-ambient reference temperature monitor 86 is positioned within the below-ambient temperature medium 84 for maintaining a calibrated temperature within the below-ambient temperature medium. In one embodiment reservoir 82 holds an ice water bath. For verification temperatures below 0-degrees Celsius, below-ambient temperature medium 84 may be salt water or some type of antifreeze. A thermo-electric cooler 88 may be employed for maintaining the below-ambient temperature of below-ambient temperature medium 84. The thermo-electric cooler 88 is generally located below reservoir 82 and may further include a heat sink 90 to aid in removing heat from the thermo-electric cooler. Heat sink 90 may further include a fan. Various types of thermo-electric coolers 88 may be employed, such as a Peltier device. Various types of heat sinks 90 may be employed. In another embodiment, reservoir 82 may become a well surrounded by a below-ambient temperature medium 84. The below-ambient temperature medium 84 is directly cooled by thermo-electric cooler 88. Below-ambient temperature verifier 26 is connected to above-ambient temperature verifier by way of a power link 92 and a communication link 94 to form a compound system 20 that can verify both above-ambient and below-ambient temperatures. Communication link 94 may be a hard wired connection or a wireless connection.

Figure 6:
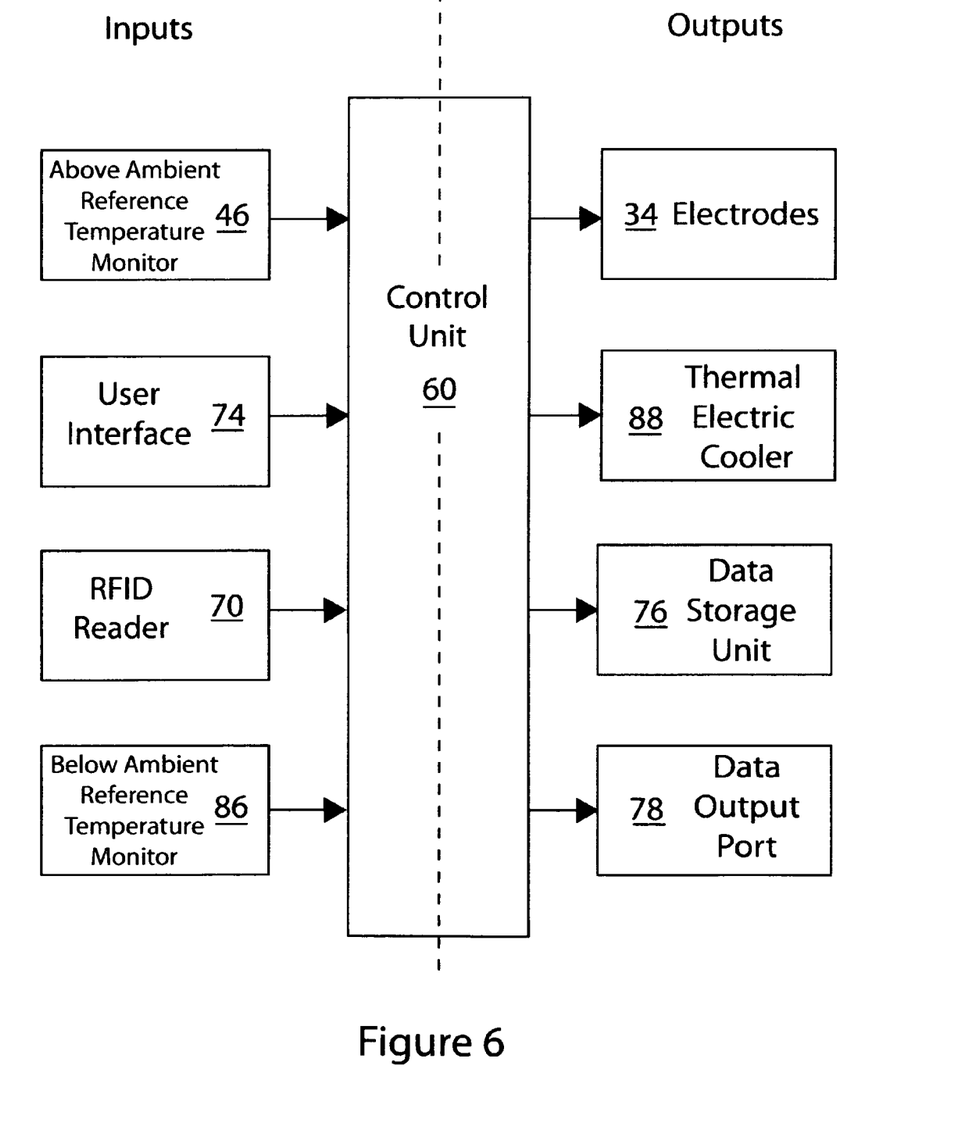
FIG. 6 is a schematic diagram showing the control unit and how it interfaces with the various components of the system for verifying temperature calibration of temperature sensors that is shown in FIGS. 1-5.

Control unit 60 is provided to integrate all the components of above-ambient temperature verifier 24 and below-ambient temperature verifier 26. All components may be hard wired to control unit 60 or have a wireless connection the control unit depending on the components requirements. Inputs to control unit 60 include above-ambient reference temperature monitor 46, user interface 74, RFID reader 70 and below-ambient reference temperature monitor 86. Outputs from control unit 60 include the electrodes 34, thermal electric cooler 88, data storage unit 76 and data output port 78. Using data from the inputs of control unit 60, the control unit maintains a calibrated temperature for both above-ambient temperature verifier 24 and below-ambient temperature verifier 26. Control unit 60 also compiles a data log of all information recorded. This data log is stored in data storage unit 76. Control unit 60 also receives data from and sends data to user interface 74.

Operation of above-ambient temperature verifier 24 is as follows. Thermal unit 31 is energized by power supply 36 to provide an applied electric current to heat ohmic material 32. The conductive nature of the ohmic material 32 allows current to flow between electrodes 34 through the ohmic material. The resistive component of the ohmic material creates heat as current flows. The electrical energy is converted to heat directly in the ohmic material 32 without the use of resistive elements or heater components. Since the entire ohmic material 32 is conductive the ohmic material heats volumetrically and therefore causes rapid and uniform heating which is beneficial to speed and accurate temperature verification.

When a temperature sensor 22 having a shaft 58 is placed in well 38, activation element 66 is pressed to activate compression assembly 44. Compression assembly 44 forces compression element 68 against conformable ohmic material 32. As ohmic material 32 is compressed, well 38 collapses around shaft 58 to make intimate contact with temperature sensor 22. A locking mechanism (not shown) holds the compressed shape until released by activation element 66 or an electronic signal. Intimate contact between ohmic material 32 and shaft 58 allows for accurate heat transfer from the ohmic material to temperature sensor 22. Above-ambient reference temperature monitor 46, which is embedded in ohmic material 32, senses the exact temperature of the ohmic material and conveys this temperature to control unit 60. Control unit 60 transfers this information to user interface 74 where it can be read by the operator. The temperature measured by temperature sensor 22 is read by the operator. The temperature of above-ambient reference temperature monitor 46 and the temperature of temperature sensor 22 are compared to determine the accuracy of the temperature sensor. Optionally, a signal is created to compare and store the temperature data or to convey the temperature data wirelessly to data storage unit 76.

System 20 is used to verify the accurate operation of temperature sensors 22 such as stem-type temperature probes. Stem-type temperature probes are commonly used in food service and in medical labs. In the food industry these probes measure temperatures of food to be served. In the medical industry these probes monitor medicines that can lose effectiveness if they are over or under a prescribed temperature. If inaccurate temperature probes are used, spoiled food or ineffective medicines could be served to unsuspecting people and this may cause illness or death. In practice, most foodservice businesses and hospitals prescribe that the accuracy of temperature probes be tested on regular intervals. Records of the accuracy testing must be maintained to prove that the accuracy testing has been completed. These records are often required in a HACCP (Hazard Analysis and Critical Control Point) program as prescribed by the U.S. Food and Drug Administration, management audits or in the case of legal action for food or drug poisoning. In some instances testing accuracy is prescribed, in which case the verifying instrument requires a verifying temperature sensor be used with a prescribed accuracy. This verification of accuracy is often referred to as NIST (National Institute of Standards and Technology) traceable accuracy, which is achieved only by use of a temperature sensor carrying a certification or test certificate conducted by NIST.

Typically, on a prescribed day and time an operator will gather all temperature sensors 22 and conduct tests to verify the accuracy of the measurements each temperature sensor is making. During the verification process it is common to measure one or more temperature points above ambient and a temperature point below ambient. Using system 20 of the present patent application, the operator will first establish a power connection to the system. The operator will select a temperature set point and allow system 20 to stabilize at this set point. If below ambient temperatures are being measured during the same round of testing, the operator will connect below-ambient temperature verifier 26 and fill reservoir 82 with ice and water. Below-ambient temperature verifier 26 will activate thermo-electric cooler 88 to maintain 0-degrees Celsius in below-ambient temperature medium 84. When both devices are ready the testing can begin.

When the RFID component of system 20 is in use, each temperature sensor 22 under test carries an RFID tag 72. RFID tag 72 provides a unique identity for each temperature sensor 22. Shaft 58 of each temperature sensor 22 is inserted through opening 42 into well 38 of above-ambient temperature verifier 24. RFID reader 70 reads the identity of the temperature sensor 22 and opens a test data file in data storage unit 76 writing this identity to the file along with a date and time stamp. The operator then activates the compression of well 38 by engaging activation element 66 of above-ambient temperature verifier 24 and locking compression system 44. Temperature sensor 22 is then allowed to settle to a stabilized temperature reading, which the operator then reads. Temperature sensor 22 should read a temperature very close to above-ambient reference temperature monitor 46 setting, if that temperature sensor is operating accurately. The operator will then verify that temperature sensor 22 passed the test or failed the test by an input action through user interface 74 on above-ambient temperature verifier 24. Above-ambient temperature verifier 24 then prompts the operator to unlock compression system 44 and remove temperature sensor 22 from well 38. Temperature sensor 22 is then placed in reservoir 82 of below-ambient temperature verifier 26. Temperature sensor 22 is allowed to stabilize and again the operator reads the measured temperature on the temperature sensor under test and compares the measurement to the below-ambient reference temperature monitor 86 setting. The operator then inputs a pass or fail criterion into user interface 74 for the below-ambient temperature measurement. Both measured temperatures are attached to the test data file and maintained in the records kept by system 20 in data storage unit 76. The operator then continues with testing the next temperature sensor 22 until all temperature sensors are tested. Upon completion of all testing, the operator can download data stored in data storage unit 76 to a digital storage device or laptop via data output port 78. Alternatively, the digital storage device or the laptop can be connected directly into output port 78 during testing for a direct download.

While several embodiments of the invention, together with modifications thereof, have been described in detail herein and illustrated in the accompanying drawings, it will be evident that various further modifications are possible without departing from the scope of the invention. Nothing in the above specification is intended to limit the invention more narrowly than the appended claims. The examples given are intended only to be illustrative rather than exclusive.

What is claimed is:

1. A system for verifying temperature calibration of a temperature sensor, comprising:
   a) a first housing;
   b) an ohmic material completely contained within said first housing, said ohmic material includes a mixture of conductive particles and dielectric particles;
   c) at least one pair of electrodes, wherein said electrodes direct an applied current through said ohmic material to heat said ohmic material;
   d) a well within said ohmic material for accepting the temperature sensor, wherein said well has an inner surface and access to said inner surface is provided through an opening in said first housing;
   e) a compression assembly cooperating with said ohmic material to reversibly compress said ohmic material around said well to create intimate contact between said inner surface and the temperature sensor when the temperature sensor is placed within said well; and
   f) an above-ambient reference temperature monitor maintaining a calibrated temperature within said ohmic material.

2. A system as recited in claim 1, wherein said conductive particles are graphite.

3. A system as recited in claim 1, wherein said ohmic material is an elastic ohmic material.

4. A system as recited in claim 1, wherein said compression assembly includes a compression element to apply a compressive force to said ohmic material to collapse said well.

5. A system as recited in claim 4, wherein said compressive element is at least one selected from the group consisting of a plate, bladder and band.

6. A system as recited in claim 1, further comprising a mode selector, wherein said mode selector sets different temperature set points for said reference temperature monitor.

7. A system as recited in claim 1, further comprising a below-ambient temperature verifier, wherein said below-ambient temperature verifier includes a second housing, a reservoir within said second housing for holding ice and water, and a below-ambient temperature reference monitor for verifying a below-ambient temperature calibration of the temperature sensor to be verified.

8. A system as recited in claim 7, further comprising a control unit and a communication link; said communication link between said control unit and said below-ambient temperature verifier.

9. A system as recited in claim 7, further comprising a control unit and a power link; said power link between said control unit and said below-ambient temperature verifier.

10. A system as recited in claim 1, further comprising a below-ambient temperature verifier; wherein said below-ambient temperature verifier includes a second housing, a thermoelectric cooler within said second housing, and a below-ambient temperature reference monitor for verifying a below-ambient temperature calibration of the temperature sensor to be verified.

11. A system as recited in claim 1, further comprising a user interface on said first housing; further comprising a control unit within said first housing; wherein said control unit receives temperature data from said user interface and said above-ambient reference temperature monitor; wherein said control unit logs temperature data about the sensor into a data storage unit interfaced with said control unit.

12. A system as recited in claim 11, further comprising an RFID reader located in said first housing, wherein said RFID reader reads an identity from an RFID tag located on the temperature sensor; wherein said identity is attached to said temperature data.

13. A system as recited in claim 1, wherein said conductive particles are solid conductive particles and said dielectric particles are solid dielectric particles.

14. A system as recited in claim 1, wherein said mixture further includes a gel to fill the space between said conductive particles and said dielectric particles.

15. A system as recited in claim 1, wherein said mixture further includes a liquid to fill the space between said conductive particles and said dielectric particles.

16. A system for verifying temperature calibration of a temperature sensor, comprising:
   a) a first housing;
   b) an ohmic material contained within said first housing;
   c) at least one pair of electrodes, wherein said electrodes direct an applied current through said ohmic material to heat said ohmic material;
   d) a well within said ohmic material for accepting the temperature sensor, wherein said well has an inner surface and access to said inner surface is provided through an opening in said first housing;
e) a sleeve for separating said ohmic material from said well, wherein said sleeve defines said inner surface;
f) a compression assembly cooperating with said ohmic material to reversibly compress said ohmic material around said well to create intimate contact between said inner surface and the temperature sensor when the temperature sensor is placed within said well; and
g) an above-ambient reference temperature monitor maintaining a calibrated temperature within said ohmic material.

17. A system as recited in claim 16, wherein said sleeve is an elastic sleeve.

18. A system for verifying temperature calibration of a temperature sensor, comprising:
a) a first housing;
b) an ohmic material contained within a flexible casing, said flexible casing within said first housing;
c) at least one pair of electrodes, wherein said electrodes direct an applied current through said ohmic material to heat said ohmic material;
d) a well within said ohmic material for accepting the temperature sensor, wherein said well has an inner surface and access to said inner surface is provided through an opening in said first housing;
e) a compression assembly partially contained within said first housing; said compression assembly applies an external force to said flexible casing to reversibly compress said ohmic material around said well to create intimate contact between said inner surface and the temperature sensor when the temperature sensor is placed within said well; and
f) an above-ambient reference temperature monitor maintaining a calibrated temperature within said ohmic material.

19. A system as recited in claim 18, wherein said ohmic material is an elastic ohmic material.

20. A system for verifying temperature calibration of a temperature sensor, comprising:
a) a first housing;
b) an ohmic material completely contained within said first housing;
c) at least one pair of electrodes, wherein said electrodes direct an applied current through said ohmic material to heat said ohmic material;
d) a well within said ohmic material for accepting the temperature sensor, wherein said well has an inner surface and access to said inner surface is provided through an opening in said first housing;
e) a compression assembly cooperating with said ohmic material to reversibly compress said ohmic material around said well to create intimate contact between said inner surface and the temperature sensor is placed within said well;
f) an above-ambient reference temperature monitor maintaining a calibrated temperature within said ohmic material;
g) an RFID reader proximate said opening;
h) a control unit interfaced with said RFID reader;
i) a data storage unit interfaced with said control unit; and
j) wherein the temperature sensor has a shaft with an RFID tag mounted to said shaft to provide a unique identity to the temperature sensor, wherein said RFID reader reads said unique identity of said RFID tag when said shaft is inserted into said opening, wherein a temperature measured by the temperature sensor is associated with said unique identity and stored in said data storage unit.

21. A system as recited in claim 20, wherein said RFID tag surrounds said shaft.

22. A system as recited in claim 20, wherein said control unit, data storage unit and RFID reader are each interfaced by at least one connection selected from the group consisting of a wired and wireless connection.

23. A system as recited in claim 20, further comprising a below ambient temperature verifier for making a separate temperature measurement with the temperature sensor; wherein below ambient temperature data from said separate temperature measurement is associated with said unique identity and stored in said data storage unit.

* * * * *